(12) United States Patent
Sleewaegen et al.

(10) Patent No.: US 11,221,418 B2
(45) Date of Patent: Jan. 11, 2022

(54) METHOD FOR CORRECTING A PSEUDORANGE IN A RECEIVER FOR SATELLITE NAVIGATION

(71) Applicant: Septentrio NV, Leuven (BE)

(72) Inventors: Jean-Marie Sleewaegen, Jette (BE); Wim De Wilde, Oud-Heverlee (BE)

(73) Assignee: Septentrio NV, Leuven (BE)

( * ) Notice: Subject to any disclaimer, the term of this patent is extended or adjusted under 35 U.S.C. 154(b) by 87 days.

(21) Appl. No.: 16/763,215

(22) PCT Filed: Oct. 22, 2018

(86) PCT No.: PCT/EP2018/078923
§ 371 (c)(1),
(2) Date: May 11, 2020

(87) PCT Pub. No.: WO2019/091769
PCT Pub. Date: May 16, 2019

(65) Prior Publication Data
US 2020/0271794 A1 Aug. 27, 2020

(30) Foreign Application Priority Data
Nov. 9, 2017 (EP) .................................... 17200916

(51) Int. Cl.
*G01S 19/40* (2010.01)
*G01S 19/30* (2010.01)

(52) U.S. Cl.
CPC .............. *G01S 19/40* (2013.01); *G01S 19/30* (2013.01)

(58) Field of Classification Search
CPC ........... G01S 19/40; G01S 19/30; G01S 19/29
USPC ...................................................... 342/357.23
See application file for complete search history.

(56) References Cited

U.S. PATENT DOCUMENTS

| 6,744,404 | B1 | 6/2004 | Whitehead et al. | |
| 2011/0050489 | A1* | 3/2011 | Maenpa | G01S 19/23 342/357.23 |
| 2019/0041527 | A1* | 2/2019 | Gustafson | G01S 19/26 |

OTHER PUBLICATIONS

Akos, Dennis M., "Effect of Sampling Frequency on GNSS Receiver Performance", Journal of the Institute of Navigation, vol. 53, No. 2, Summer 2006.

(Continued)

*Primary Examiner* — Harry K Liu
(74) *Attorney, Agent, or Firm* — Kolitch Romano LLP

(57) ABSTRACT

A correction is applied to a pseudorange measured by a satellite navigation receiver, operating on the basis of signals sampled at a sampling frequency $F_s$, wherein the correction is based on the measured pseudorange itself. The correction may be a correction to the discriminator value determined in the DLL, or it may be correction to the actual pseudorange as such. The correction is specific for a particular PRN code and for the parameters of the receiver. The correction is therefore implemented in the receiver as a predefined function of the measured pseudorange, to be calculated in real time, or as a look-up table of pre-defined values at least between 0 and $cT_s$, with $T_s$ equal to $1/F_s$ and c the speed of light.

18 Claims, 10 Drawing Sheets

(56) References Cited

OTHER PUBLICATIONS

Jin, Xiaojun, et al., "PN Ranging Based on Noncommensurate Sampling: Zero-Bias Mitigation Methods", IEEE Transactions on Aerospace and Electronic Systems, vol. 53, No. 2, Apr. 2017.
Ouirk, Kevin J., et al., "PN Code Tracking Using Noncommensurate Sampling", IEEE Transactions on Communications, vol. 54, No. 10, Oct. 2006.
Sleewaegen, J.M., et al., "Zero-Doppler Pseudorange Biases", Proceedings of the 2018 Precise Time and Time Interval Meeting, ION PTTI 2018, Reston, Virginia, Jan. 29-Feb. 1, 2018.

* cited by examiner

METHOD FOR CORRECTING A PSEUDORANGE IN A RECEIVER FOR SATELLITE NAVIGATION

FIELD

The present disclosure is related to a method and apparatus for receiving and processing signals, e.g., signals of the spread spectrum type, such as are used in Global Navigation Satellite Systems (GNSS).

INTRODUCTION

Global Navigation Satellite System (GNSS) is a general name for a satellite navigation system. A GNSS system comprises, among other things, a constellation of multiple navigation satellites, which are orbiting the earth and which transmit dedicated navigation signals also called 'ranging signals'. Most known is the Global Positioning System (GPS) developed by the United States Government. Other systems include the Galileo system which is currently in development by the European Space Agency (ESA), the Russian GLONASS and the Chinese BeiDou system. The primary purpose of these systems is to provide position, velocity and time to any user on or near the Earth's surface. The user determines his position in space and time by measuring his range to at least 4 satellites whose position and time are accurately determined, the range being defined as the distance between the user and a satellite.

The satellites of a satellite based positioning system transmit signals on several L-band carriers. The carriers are modulated by pseudo-random (PRN) spreading codes that are unique to each satellite, and by a navigation message. Generally, all satellites transmit at the same frequencies. The separation between the satellites is possible because all the PRN codes are chosen to be orthogonal. The receiver measures the time difference between the signal emission by the satellite and its reception by the receiver. This time difference, multiplied by the speed of light, is the pseudorange. The term "pseudorange" is used instead of "range" because the time difference is measured with non-ideal clocks and contains a clock offset term. To measure the time difference, the receiver synchronizes a local replica of the spreading code with the spreading code incoming from the satellite. The time difference is the delay that the receiver had to apply to its local replica to synchronize it with the incoming code. Synchronizing the local replica involves two steps. First a coarse synchronization needs to be obtained. This is called acquisition. Usually this is accomplished by correlating (e.g., integrating the multiplication of both signals) the local replica with the input signal and gradually delaying it until the correlation results in a peak.

Once acquired, the second step is tracking the spreading code. This is accomplished by a Delay-Lock-Loop (DLL). In a common implementation of the DLL, an advanced (early (E)) and a delayed (late (L)) version of the local replica is generated in addition to the on-time replica (punctual (P)). The delay between the early and late replicas is called the tracking gate width and is noted d. The difference between the E and L replicas is correlated with the base-band input signal. The output of this correlation is proportional to the misalignment between the local punctual replica and the incoming code. The signals involved in the DLL are illustrated in FIG. 1.

FIG. 1 shows the incoming PRN code (IN), taking values +1 or −1, the three local replicas (P, E, L), the difference between the E and L replicas (E-L) and the product of (E-L) and IN. The PRN transitions in the IN signal are not instantaneous due to the receiver frontend filtering. The figure illustrates the case when the DLL is in lock, e.g., the punctual local replica (P) is aligned with the incoming code. The chip boundaries of the incoming code are marked by the vertical lines. The E-L correlation is obtained by integrating the (E-L)*IN signal during a certain time interval, usually a multiple of one millisecond. If the local punctual replica is synchronized with the input signal, like in the figure, it can be seen that (E-L)*IN has zero mean, in other words, the correlation of these two signals is zero. If the local punctual replica was delayed with respect to the input signal the correlation would be positive. Conversely, if the local replica was advanced the correlation would be negative. This provides feedback, for example a positive E-L correlation output indicates the local replica needs to be sped up, a negative output that it needs to be slowed down. In the DLL, the normalized value of the E-L correlation is used as a discriminator value, of which the output controls the chipping rate of the local replicas.

The prior art implementation of a DLL is illustrated in FIG. 2. The incoming signal (IN) is the signal received from the satellites downconverted to baseband. A code generator 1 followed by two delay elements 2 and 3 generates the three replicas of the PRN code. The punctual replica is multiplied by a first multiplier 4 with the incoming signal (IN) and the product is accumulated over the correlation interval in a first correlator 5, which yields the P (punctual) correlation value (CP). The late replica is subtracted from the early replica and the result is multiplied with IN in a second multiplier 6 and accumulated in the E-L correlator 7 to yield the E-L correlation value (CE-L). In the discriminator block 8, the E-L correlation value is divided by twice the P correlation value. The result is a quantity known as the discriminator value which, in the typical operating region of the DLL, is equal to the time offset between the local code replica and the incoming code, expressed in units of chips. The discriminator output is low-pass filtered in the DLL filter 9 and the result ($\Delta F$) drives the frequency of the code NCO (numerically controlled oscillator) 10. The code NCO generates a pulse at each chip boundary, which instructs the code generator 1 to output the next chip of the code. When $\Delta F$ is positive, the code NCO runs faster, causing the local code replica to advance in time. When $\Delta F$ is negative, the code NCO runs slower, causing the local code replica to delay in time. The DLL converges to a point where the discriminator value is zero, hence where $\Delta F$ is zero.

The pseudorange is the delay of the punctual code replica compared to a code replica that would be generated synchronously with the receiver time, multiplied by the speed of light. It is computed from the phase of the code generator. The DLL described above uses a coherent early-minus-late discriminator. Many other discriminator types are known in the art. For example, document U.S. Pat. No. 5,953,367 discloses a DLL of which the discriminator value is based on four correlation values. The accuracy of the synchronization of the local punctual code with the incoming code, i.e. the accuracy at which the pseudoranges can be determined, closely depends on the ability to locate the time of the incoming PRN chip transitions. The analysis of the DLL behavior and in particular the pseudorange accuracy is described in detail in the literature. For example, John W Betz and Kevin R Kolodziejski, in "Extended Theory of Early-Late Code Tracking for a Bandlimited GPS Receiver. Navigation, 47(3):211-226, 2000" provide expressions for the code tracking error variance as a function of code characteristics and the receiver parameters. However, the DLL model described in that document, like most models found in the literature, makes the assumption that the signal processing uses continuous signals and does not take time discretization into account. For example, the position of the chip transitions in the local code replicas are assumed to be controllable with an infinite precision.

In reality, most if not all modern GNSS receivers process the signals in the digital domain after sampling at a finite frequency Fs. This means that the DLL does not have access to the continuous signal from the satellite, but only to discrete samples taken, for example, every Ts=1/Fs. Instead of having to synchronize two continuous signals (the incoming signal and the local replicas), the DLL has to synchronize two sequences of discrete samples. Intuitively, it is expected that the ability to locate the PRN chip transitions will degrade if the sampling frequency is low as the number of samples falling in the chip transitions will decrease. Accurate pseudorange determination requires enough samples evenly distributed around the chip transitions to minimize the effect of time discretization.

FIG. 3a shows the type of pseudorange error that results from the time discretization. It is obtained using a geodetic-grade receiver tracking a real GNSS signal from an orbiting satellite. The error (curve 15) exhibits a cyclic pattern and is most prominent when the apparent Doppler frequency (curve 16) is small, i.e. when the measured pseudorange does not change quickly as a function of time. FIG. 3b shows the pseudorange error 15 over an entire satellite pass, together with the Doppler frequency 16. As expected, the pseudorange error is larger at the beginning and end of the pass due to the low elevation of the satellite. FIG. 3a is an enlarged image of the 'glitch' 17 around the zero-crossing of the Doppler. FIG. 3b shows the example of a MEO (Medium-Earth-Orbit) GNSS satellite. The problem of the pseudorange error at Doppler frequency around zero is even more acute when signals of geostationary satellites are used, as the Doppler stays close to zero at all times. Some researchers have analyzed the effect of a finite sampling frequency on the pseudorange variance. For example, Dennis M. Akos and Marco Pini, in "Effect of Sampling Frequency on GNSS Receiver Performance. Navigation, 53(2): 85-95, 2006" analyse the pseudorange noise variance as a function of the sampling frequency and show that the worst-case noise increase occurs close to the zero-Doppler condition. Document "Vinh T Tran et al. The effect of sampling frequency and front-end bandwidth on the DLL code tracking performance. IGNSS Symposium 2015" shows the relationship between the receiver frontend filter bandwidth and the sampling frequency in terms of pseudorange variance.

As illustrated by these publications, it is known in the prior art that time discretization in digital receivers has an effect on the accuracy of the pseudorange. The proposed approach to dealing with this problem consists mainly in quantifying the accuracy degradation in terms of pseudorange variance, and in increasing the sampling frequency to minimize the effect of the time discretization. However, changing the sampling frequency is often unpractical and leads to an unacceptable increase in receiver complexity and power consumption.

Document "XiaoJun Jin et al., PN Ranging Based on Noncommensurate Sampling: Zero-Bias Mitigation Methods, IEEE Transactions on Aerospace and Electronic Systems, Vol. 53. No. 2, April 2017" discloses a way to compensate for the discretization effect, but only addresses the case of constant pseudoranges and hence constant zero biases, e.g., in the case where the Doppler is strictly zero. The mitigation technique is not directly applicable to GNSS as GNSS pseudoranges and hence biases do change over time, as illustrated by the oscillations in FIG. 3a.

SUMMARY

The present disclosure is directed at correcting the pseudorange errors that result from the finite sampling frequency used in most GNSS receivers. Systems and methods of the present disclosure do not require modifying the sampling frequency, and can thus be applied to existing receivers with minimal impact on the receiver complexity. It is also suitable to the case of non-constant errors that result from the change of pseudoranges over time. This aim is achieved by the receiver and method disclosed in the appended claims.

A correction is applied to the pseudorange measured by a satellite navigation receiver in accordance with the present disclosure, operating on the basis of signals sampled at a sampling frequency Fs, wherein the correction is based on the measured pseudorange itself. The correction may be a correction to the discriminator value determined in the DLL, or it may be correction to the actual measured pseudorange as such. The correction is specific for a particular PRN code and for the parameters of the receiver. The correction is therefore implemented in the receiver as a function of the measured pseudorange to be calculated in real time, or as a look-up table of pre-defined values at least between 0 and cTs with Ts equal to 1/Fs and c the speed of light.

According to a first embodiment, the present disclosure is related to a method for correcting a measured pseudorange obtained by a receiver for satellite navigation, the receiver comprising a delay-lock-loop (DLL) including a DLL filter and a discriminator for calculating a discriminator value D, wherein the measured pseudorange is an estimation of a true pseudorange, the method comprising the steps of:
  downconverting an RF signal emitted by a satellite to a baseband or to an IF frequency, to thereby obtain a downconverted signal containing at least a pseudo-random noise (PRN) code representative of the satellite,
  sampling the downconverted signal to thereby obtain a discrete-time signal at a given sampling frequency $F_s$,
  synchronizing a local replica of the PRN code with the sampled signal on the basis of the discriminator value filtered by the DLL filter, and determining the measured pseudorange $c\tau_r$ from the synchronized local replica, wherein $\tau_r$ is the time delay of the synchronized local replica and c is the speed of light, with $\tau_r$ an estimate of the time delay $\tau_s$ of the incoming code from the satellite, and with $\Delta\tau = \tau_r - \tau_s$ so that the pseudorange error is equal to $c\Delta\tau$, wherein the receiver is configured to determine a correction term $c\Delta\tau_b$ for the pseudorange error wherein the correction term is a periodic function of the measured or the true pseudorange with a period equal to $cT_s$, with $T_s$ equal to $1/F_s$, wherein $\Delta\tau_b$ is the value of $\Delta\tau$ for which the discriminator value D is zero, and wherein the method comprises the steps of:
  determining $c\Delta\tau_b$ at the measured pseudorange,
  filtering $c\Delta\tau_b$ by a low-pass filter having the same or similar characteristics as the DLL filter,
  subtracting the filtered $c\Delta\tau_b$ value from $c\tau_r$ to obtain a corrected pseudorange value.

The receiver may be configured to calculate in real time the value of $c\Delta\tau_b = c\Delta\tau$ (D=0), using the measured pseudorange as input for the calculation. Alternatively, the receiver may comprise a look-up table comprising a plurality of values of $c\Delta\tau_b$ for a plurality of values of the true or measured pseudorange at least between 0 and $cT_s$, wherein $c\Delta\tau_b$ is determined by interpolation between values of the look-up table. The values of the look-up table may be determined by calculation of $\Delta\tau_b$ as the value of $\Delta\tau$ for which the discriminator value D is zero at said plurality of true or measured pseudoranges at least between 0 and $cT_s$ or by calibration of the receiver on the basis of simulated signals or real-life signals. According to an embodiment, $\Delta\tau_b$ is set to zero when the Doppler frequency exceeds a given threshold.

According to a second embodiment, the present disclosure is related to a method for correcting a measured pseudorange obtained by a receiver for satellite navigation, the receiver comprising a delay-lock-loop including a DLL filter and a discriminator for calculating a discriminator value D, wherein the measured pseudorange is an estimation of a true pseudorange, the method comprising the steps of:
  downconverting an RF signal emitted by a satellite to a baseband or to an IF frequency, to thereby obtain a downconverted signal containing at least a pseudo-random noise (PRN) code representative of the satellite,
  sampling the downconverted signal to thereby obtain the PRN code sampled at a given sampling frequency $F_s$,
  synchronizing a local replica of the PRN code with the sampled signal on the basis of the discriminator value filtered by the DLL filter, and determining the measured pseudorange $c\tau_r$ from the synchronized local replica, wherein $\tau_r$ is the time delay of the synchronized local replica and c is the speed of light, with $\tau_r$ an estimate of the time delay $\tau_s$ of the incoming code from the satellite, and with $\Delta\tau=\tau_r-\tau_s$ so that the pseudorange error is equal to $c\Delta\tau$,
wherein the receiver is configured to determine a discriminator correction term $D_b$ for the discriminator value D wherein the correction term is a periodic function of the measured or the true pseudorange with a period equal to $cT_s$, with $T_s$ equal to 1/Fs, wherein Db is the value of D when $\Delta\tau$ is zero and wherein the method comprises the steps of:
  determining $D_b$ at the measured pseudorange,
  subtracting $D_b$ from the discriminator value D calculated by the discriminator prior to the DLL filter, to obtain a corrected discriminator value, wherein the synchronizing step is done on the basis of the corrected discriminator value, filtered by the DLL filter (9).

The receiver may be configured to calculate in real time the value of $D_b=D(\Delta\tau=0)$, using the measured pseudorange as input for the calculation. Alternatively, the receiver may comprise a look-up table comprising a plurality of values of $D_b$ for a plurality of values of the true or measured pseudorange at least between 0 and $cT_s$, wherein $D_b$ is determined by interpolation between values from the look-up table. The values from the look-up table may be determined by calculation of $D_b$ as the value of D when $\Delta\tau$ is zero at said plurality of true or measured pseudoranges at least between 0 and $cT_s$ or by calibration of the receiver on the basis of simulated signals or real-life signals. According to an embodiment, $D_b$ is set to zero when the Doppler frequency exceeds a given threshold.

The 'discriminator value' referred to above and in relation to the first and second embodiment is a value representing the misalignment between a received signal and a local replica of the signal. The local replica is a prompt local replica produced in the DLL which furthermore produces at least one advanced or delayed replica on the basis of which the discriminator value is determined.

Aspects of the present disclosure are further related to a receiver for satellite navigation comprising:
  an antenna for capturing an RF signal from a global navigation satellite,
  a downconvertor for obtaining a signal containing at least a pseudo-random noise code (PRN) representative of the satellite,
  A sampler for sampling the signal so as to obtain a discrete sequence at a sampling frequency $F_s$,
  A delay lock loop circuit comprising:
    A code generator and delay elements for generating local punctual, early and late replicas of the PRN code,
    Correlators for calculating correlation values between the incoming downconverted signal and the local replicas or combinations of said local replicas,
    a discriminator circuit for calculating a discriminator value from the correlation values,
    a first filter circuit for low-pass filtering the discriminator output,
    a numerically controlled oscillator for controlling the chipping rate of the local replicas,
    a pseudorange calculator for calculating a measured pseudorange from the phase of the punctual replica,
wherein the receiver further comprises:
  a pseudorange correction calculator for calculating $c\Delta\tau_b$ in accordance with the method according to the first embodiment,
  a second filter circuit for applying a low-pass filtering to the output of the pseudorange correction calculator, the second filter circuit having the same characteristics as the first filter circuit,
  a subtraction circuit for determining the corrected pseudorange.

The invention is furthermore related to a receiver for satellite navigation comprising:
  an antenna for capturing an RF signal from a global navigation satellite,
  a downconvertor for obtaining a signal containing at least a pseudo-random noise code (PRN) representative for the satellite,
  A sampler for sampling the signal so as to obtain a discrete sequence at a sampling frequency $F_s$,
  A delay lock loop circuit comprising:
    A code generator and delay elements for generating local punctual, early and late replicas of the PRN code,
    Correlators for calculating correlation values between the incoming downconverted signal and the local replicas or combinations of said local replicas,
    a discriminator circuit for calculating a discriminator value from the correlation values,
    a filter circuit for low-pass filtering the discriminator output,
    a numerically controlled oscillator for controlling the chipping rate of the local replicas,
    a pseudorange calculator for calculating a measured pseudorange from the phase of the punctual replica,
wherein the DLL further comprises:
  a calculator for calculating $D_b$ in accordance with the method according to the second embodiment,
  a subtraction circuit for determining the corrected discriminator value.

DETAILED DESCRIPTION

Figure 1:
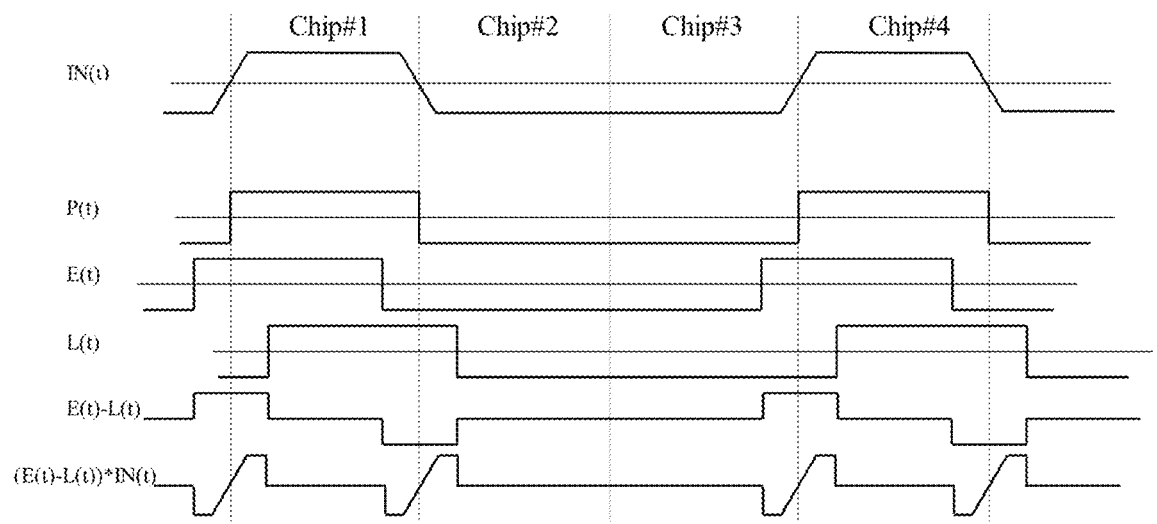
FIG. 1 illustrates the analog signals involved in the delay-lock-loop of a GPS receiver as known in the art.
Figure 4:
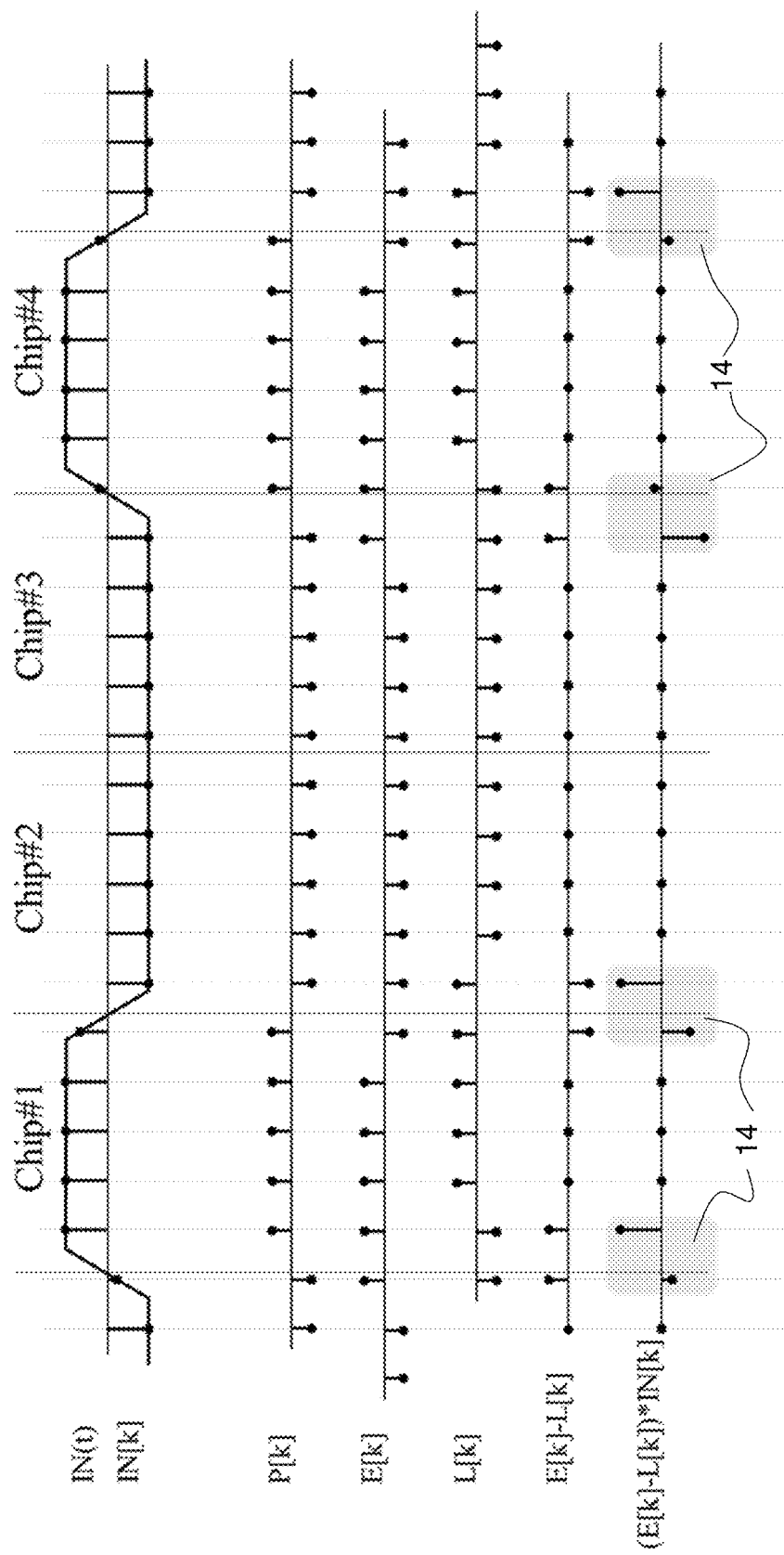
FIG. 4 illustrates the discrete-time signals involved in the delay-lock-loop in a receiver known in the art.

The present disclosure is related to digital GNSS receivers where the IF or baseband signal is sampled. Taking time discretization into account, FIG. 1 must be revisited. A more realistic representation of the different signals involved in the DLL is therefore given in FIG. 4, which takes time discretization into account. The signals shown in FIG. 4 correspond to those shown in FIG. 1, but in the digital domain. The sampling epochs are shown as vertical gray lines and the DLL processes a series of discrete samples represented by the dots. IN(t) is the analog signal and INThe following paragraphs explain how to compute the E-L correlation and the discriminator value as a function of the PRN code, the delay of the incoming and local codes and the receiver parameters (IF bandwidth, early-late gate width and sampling frequency), taking time discretization into account.

The unfiltered and un-delayed PRN code is given by the following expression:

$$e(t) = \sum_{k=-\infty}^{\infty} chip_{\{k\}_N} rect(t - kT_c)$$

where $chip_k$ is the value of the k-th chip of the PRN code (−1 or +1), $\{k\}_N$ is k modulo N, N is the number of chips in the PRN code (e.g., 1023 for the GPS CA code), $T_c$ is the chip duration, rect(x) is 1 for $0 \le x < T_c$ and zero otherwise. It is to be noted that some GNSS PRN codes are modulated by a subcarrier. The subcarrier modulation is not shown explicitly here for the sake of clarity, but the derivations below, and other aspects of the present disclosure, equally apply to PRN codes modulated by a subcarrier.

In the following derivations, $\tau_s$ is the time delay of the code incoming from the satellite and $\tau_r$ is the time delay of the local punctual replica. The true pseudorange is $c\tau_s$, where c is the speed of light, and the measured pseudorange is $C\tau_r \cdot \Delta\tau = \tau_r - \tau_s$ is the misalignment between the local punctual replica and the incoming code, and $c\Delta\tau$ is the difference between the measured pseudorange and the true pseudorange, i.e. it is the pseudorange error.

The signal received from the satellite after frontend filtering is:

$$IN(t)=H*e(t-\tau_s)=H*e(t-\tau_r+\Delta\tau)$$

Where H represents the satellite and receiver frontend filtering. In the context of the derivations below, the filter is approximated by an ideal zero-delay rectangular filter centered at IF and with a given two-sided bandwidth.

The IN(t) signal is continuous. It is sampled at a frequency $F_s$ and the resulting samples read:

$$IN[k]=IN(k \cdot T_s)$$

Where $T_s=1/F_s$ is the sampling interval.

Figure 2:
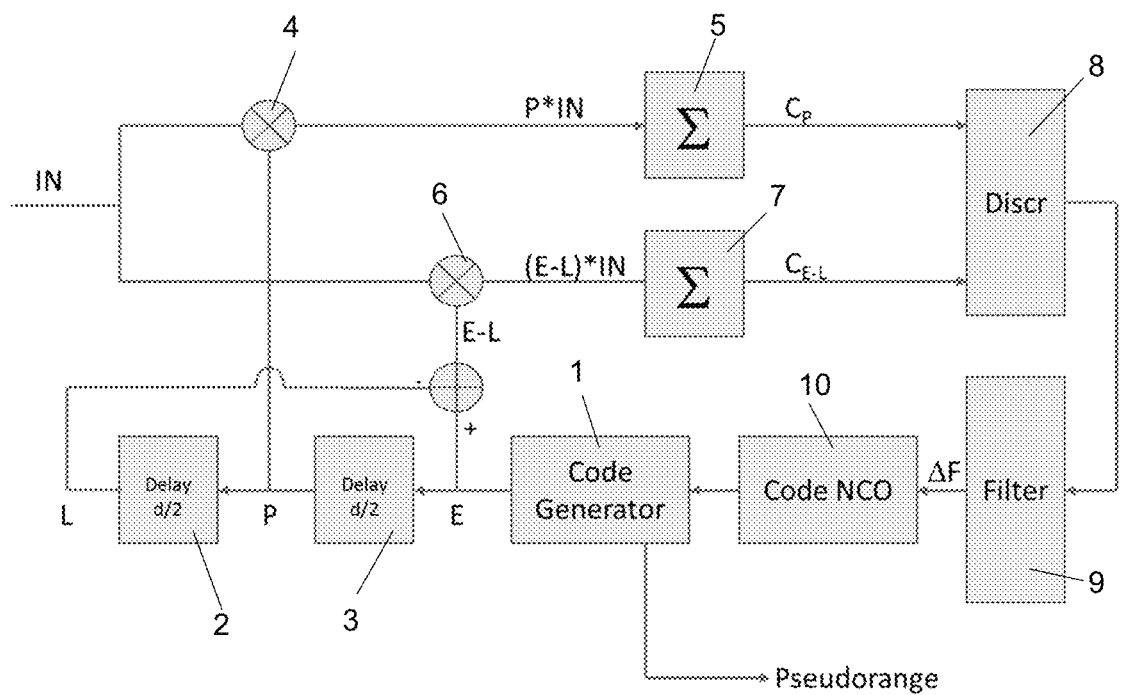
FIG. 2 shows an example of a DLL block diagram in a receiver known in the art.

The receiver generates its local punctual replica with a delay $\tau_r$, and the early and late replicas are advanced and delayed by d/2 respectively (see FIG. 2). The Plt is noted that the derivation of the discriminator value presented above took the example of an E-L discriminator using one early, one punctual and one late replica. It is straightforward for a person skilled in the art to adapt the derivation above to any type of DLL discriminator based on correlating the incoming code with any number of time-delayed local replicas, such as the dot-product discriminator, the double-delta discriminator, etc. The 'discriminator value' is therefore not limited to above equation (1) in the present disclosure, but could be based on equivalent equations, for example those based on different types of DLL discriminators (e.g., different hardware devices for determining a discriminator value). It is to be interpreted as a value representing the misalignment between a received signal and a local replica of the signal.

Figure 5:
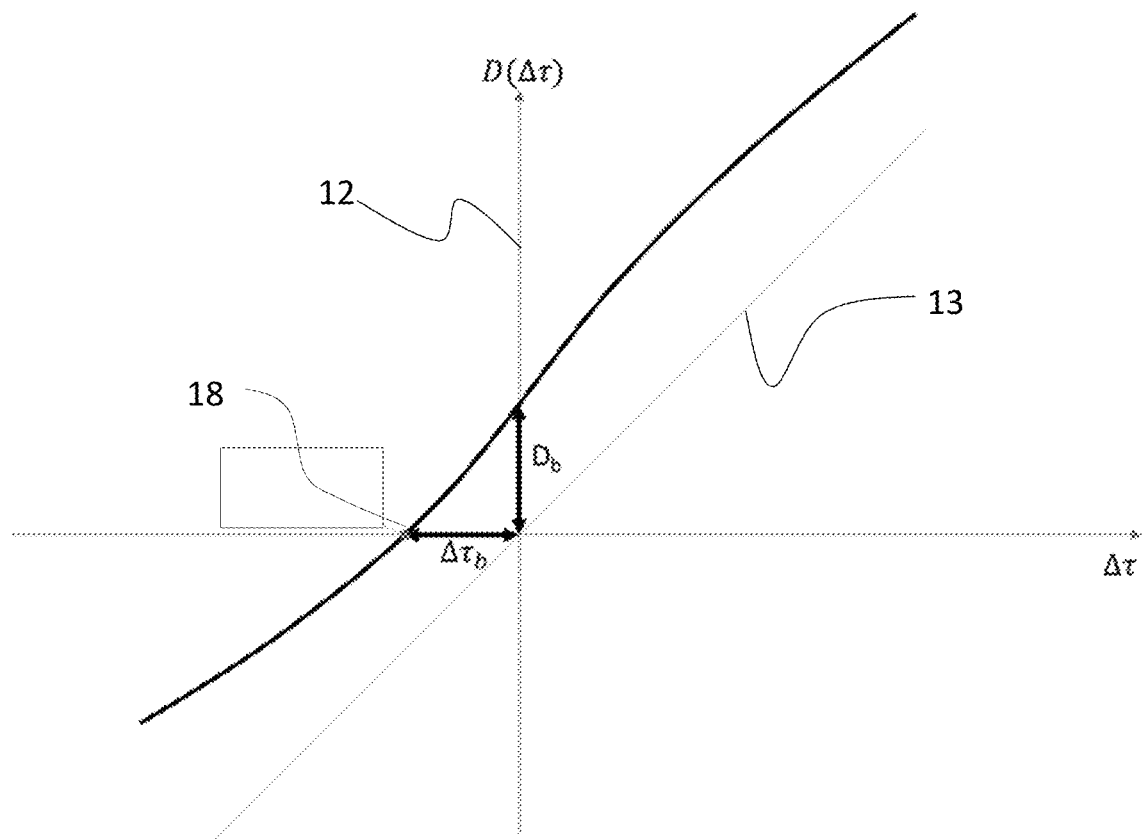
FIG. 5 shows an example of DLL discriminator distortion caused by time discretization in a receiver known in the art.

When using the above or equivalent equations to compute the $D(\Delta\tau)$ function for a given PRN code and for a given value of $\tau_s$ or $\tau_r$, one obtains a curve similar to the curve 12 in FIG. 5. The dotted line 13 in that figure shows what the nominal discriminator response should be. The DLL will converge to the lock point 18 where $D(\Delta\tau)$ is zero, but this will not occur at $\Delta\tau=0$. A misalignment $\Delta\tau_b$ will exist, causing a pseudorange error of $c\Delta\tau_b$. There are two ways to correct for this error: (i) shift the discriminator value so that the zero crossing occurs at $\Delta\tau=0$, i.e. subtract $D_b$ from the discriminator value, or (ii) subtract $c\Delta\tau_b$ from the measured pseudorange. These two approaches are applied in two respective embodiments of the method and of a receiver in accordance with the present disclosure.

Figure 6:
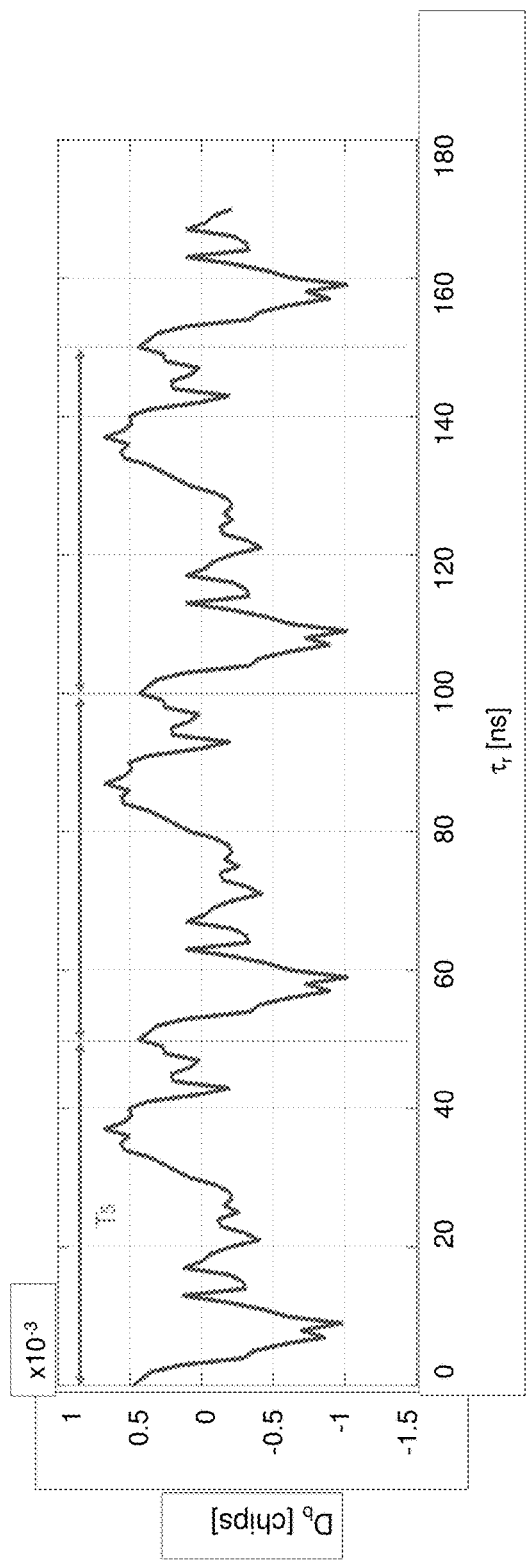
FIG. 6 shows an example of DLL discriminator offset caused by time discretization.
Figure 7:
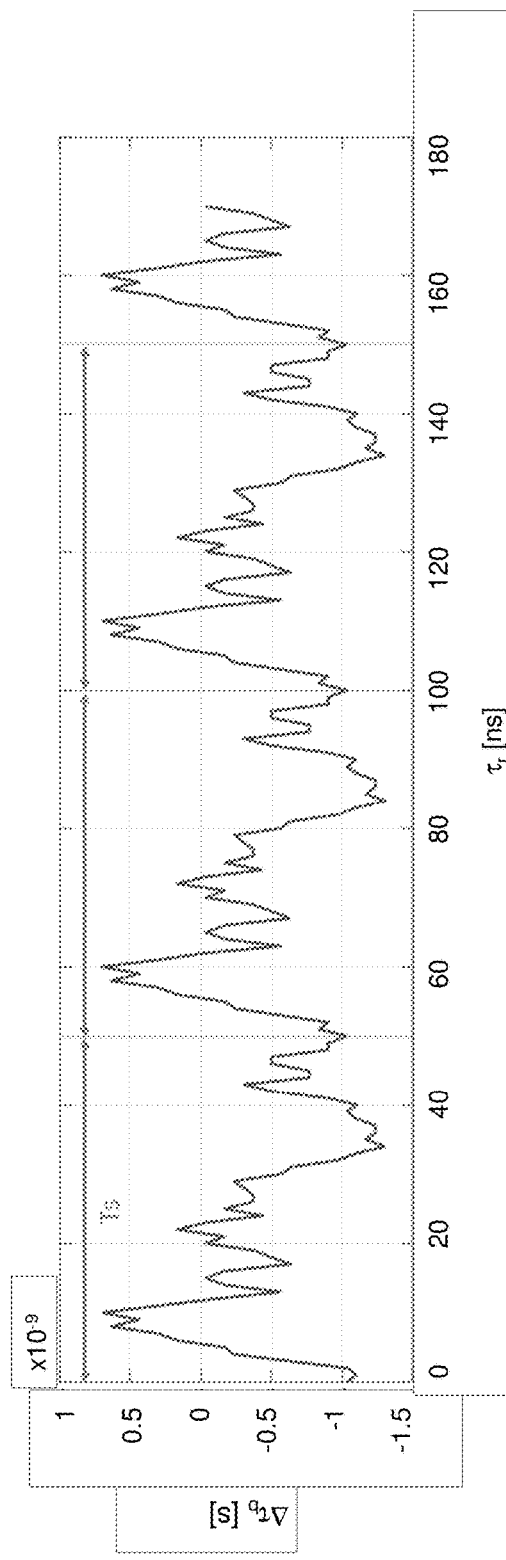
FIG. 7 shows an example of pseudorange offset caused by time discretization.

For a receiver with known sampling frequency Fs, IF bandwidth and early-late gate width d, the values of $D_b$ and of $\Delta\tau_b$ depend on the PRN code and $D_b$ as well as of $\Delta\tau_b$ can be computed as a function of $\tau_s$ or $\tau_r$ (or equivalently as a function of the true or of the measured pseudorange) using the above equations. For example, $D_b$ and $\Delta\tau_b$ are shown in FIG. 6 and FIG. 7 as a function of $\tau_s$ and $\tau_r$ respectively. Instead of this, similar curves can be drawn for $D_b$ and $\Delta\tau_b$ as a function of $\tau_r$ and $\tau_s$ respectively. The figures apply to the following conditions: GPS CA code PRN#1, IF dual-sided bandwidth=16 MHz, Fs=20 MHz, d=100 ns, 1 ms integration time (M=20000), $0<\tau_s<170$ ns, $0<\tau_r<170$ ns.

As can be seen, $D_b$ and $\Delta\tau_b$ are periodic functions of $\tau_s$ or $\tau_r$: the same error repeats every Ts, for example, every 50 ns in the example shown corresponding to a sampling frequency Fs=20 MHz. The figures only show the first three periods but the same pattern may repeat indefinitely. This is expected as the phase relationship between the incoming code and the sampling clock repeats itself every Ts seconds. This means that $D_b$ and $\Delta\tau_b$ depend on $\tau_s$ modulo Ts or $\tau_r$ modulo Ts. Therefore, when $D_b$ and $\Delta\tau_b$ are known for τs or τr between 0 and Ts seconds, they are known for any value of τs or τr higher than Ts. Also, because the true and the measured pseudoranges equal $c\tau_s$ and $c\tau_r$, it can be said that $D_b$ and $\Delta\tau_b$ depend on the true or measured pseudorange modulo cTs. For example when Ts equals 50 ns, cTs equals 15 m. So when $\Delta\tau_b$ or Db is known for the measured pseudorange between 0 and 15 m, it can be calculated for any measured pseudorange.

FIG. 7 may thus be interpreted as follows: if the measured pseudorange is PR, the true pseudorange can be obtained by subtracting the value of $\Delta\tau_b$ evaluated at $\tau_r=\{PR/c\}_{T_s}$, and multiplied by the speed of light, where $\{X\}_Y$ is X modulo Y. Note that the curves in FIG. 6 and FIG. 7 are specific to a given PRN code, i.e., to a given satellite. Each PRN code and hence each satellite has its own values of $D_b$ and $\Delta\tau_b$ as a function of $\tau_s$ or $\tau_r$. These values $D_b$ and $\Delta\tau_b$ are implemented in the receiver—for the various PRN codes in use by the satellites involved in a ranging application—as a function or look-up table. In other words, the receiver is configured for determining Db or $\Delta\tau_b$ for a given measured pseudorange. When a look-up table is implemented in the receiver, the table needs only be defined for pseudoranges between 0 and cTs, given the fact that Db and $\Delta\tau_b$ are periodic functions of the pseudorange (with period cTs). The measured pseudorange modulo cTs is then used as input for determining the correction term $D_b$ or $\Delta\tau_b$. For example, the receiver may include a look-up table containing a hundred values for Db or $\Delta\tau_b$ corresponding to $$\{\text{Pseudorange}\}_{cT_s} = \frac{k}{100} \cdot cT_s$$

with k=0 . . . 99. The receiver is furthermore configured (see further in description of particular embodiments based on correction of D or cΔτ) to determine the value of $D_b$ or Δτb obtained by interpolating these tabulated values at the actual value of $\{\text{Pseudorange}\}_{cT_s}$. Taking again the example where cTs equals 15 m: when the measured pseudorange is 50 m, the pseudorange modulo cTs is 50−3×15=5 m, and the look-up table allows to determine $D_b$ or Δτb at 5 m. The look-up table comprises values at least between 0 and cTs. It may comprise values above cTs as well. More generically, the correction terms $D_b$ and $\Delta\tau_b$ are periodic functions of the true or measured pseudorange with period ncTs, with n an integer equal to or higher than 1, e.g., a multiple integer of cTs. The look-up table may thus be defined in the range between 0 and an integer multiple of cTs, in which case the measured pseudorange modulo ncTs is used as input for determining the correction term.

As stated above, the function or look-up table implemented in the receiver for determining Db or $\Delta\tau_b$ may be defined as a function of the true pseudorange cτs or as a function of the measured pseudorange cτr. It is however the measured pseudorange that is used as input value for determining Db or $\Delta\tau_b$. If the function or lookup table is implemented as a function of the true pseudorange, the measured pseudorange is entered as the true pseudorange for determining the correction terms. The initial difference between true and measured pseudorange will in that case however be quickly removed as the pseudorange is corrected.

The relation between the correction terms Db or $c\Delta\tau_b$ and the measured or true pseudorange is predefined for each PRN code and for the parameters of the receiver (Fs, d, IF bandwidth), which enables the use of the measured pseudorange itself for determining the correction term. This feature is particularly useful for mitigating the pseudorange error at low Doppler frequencies as illustrated in FIGS. 3a and 3b, without increasing the sampling frequency Fs.

Figure 3A:
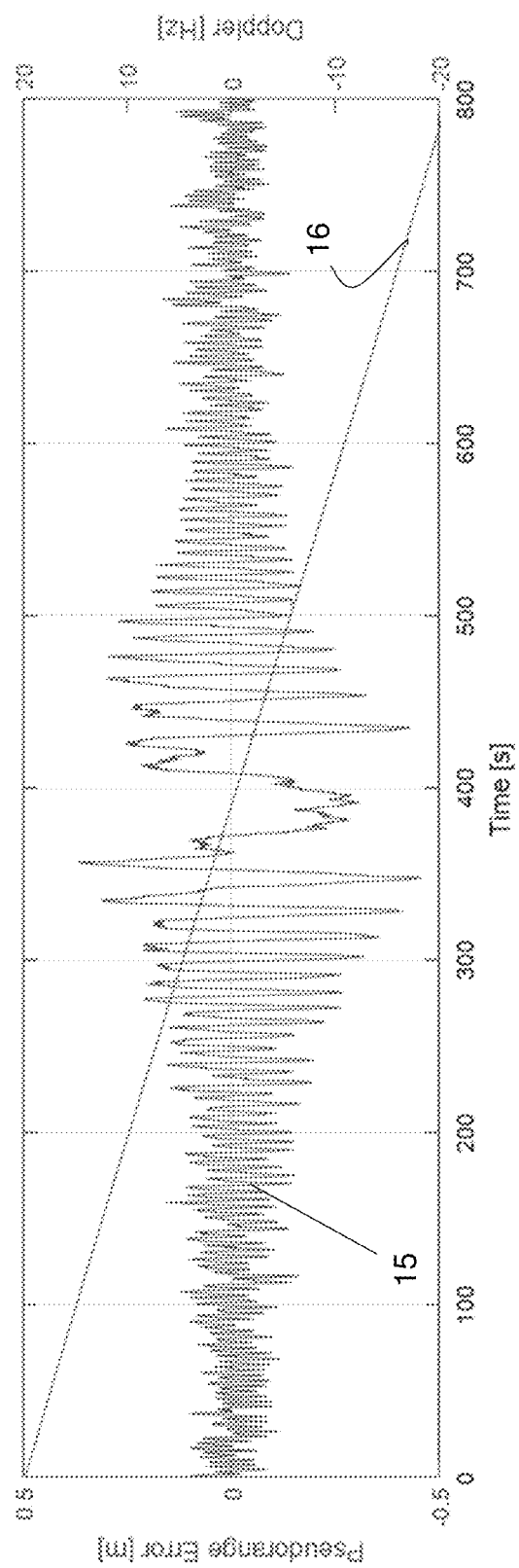
FIG. 3A illustrates the pseudorange errors that are caused by time discretization in a GNSS receiver known in the art, for low values of the Doppler frequency.
Figure 3B:
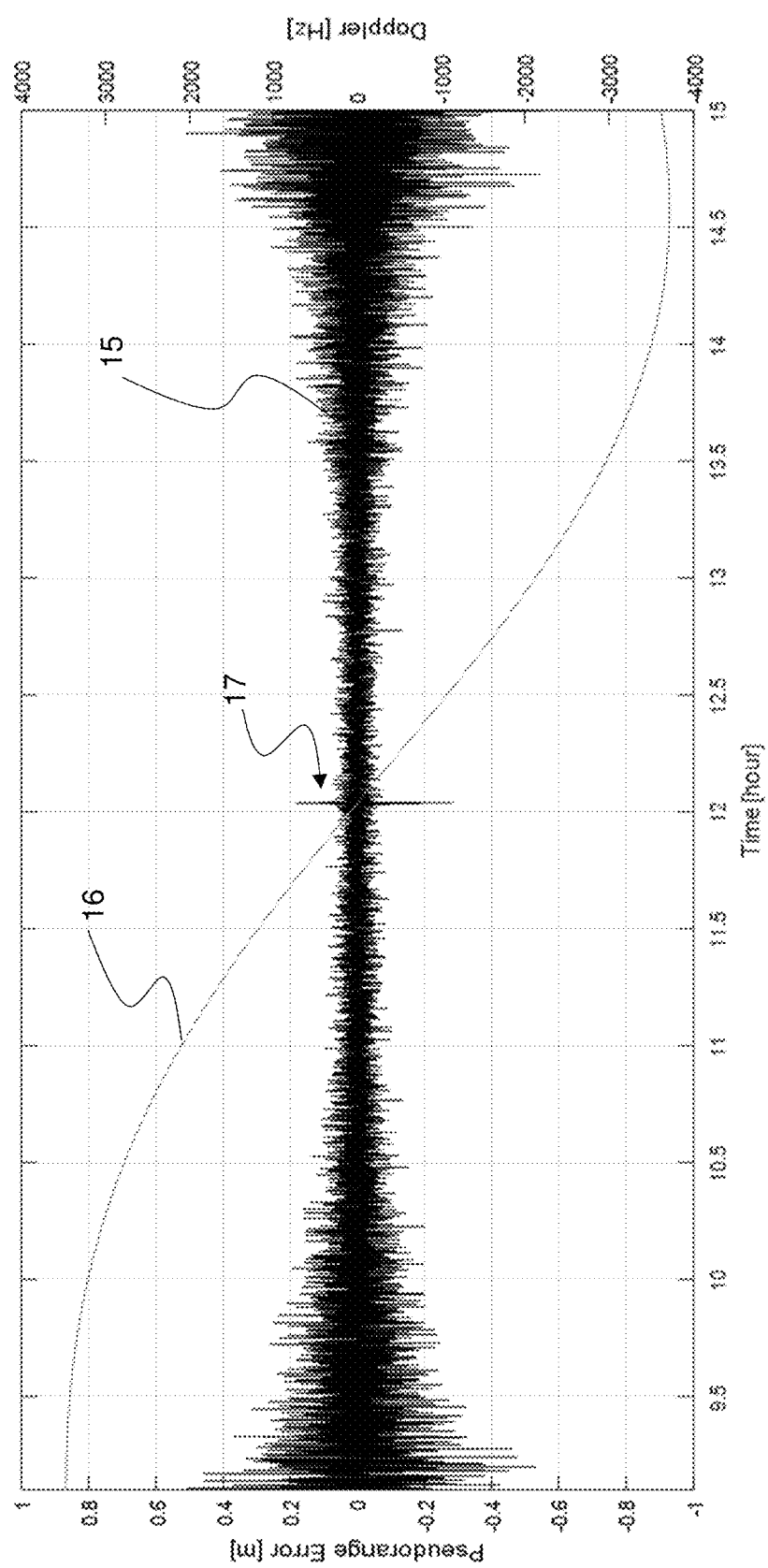
FIG. 3B shows the pseudorange error for an entire pass of an orbiting MEO satellite.
Figure 8:
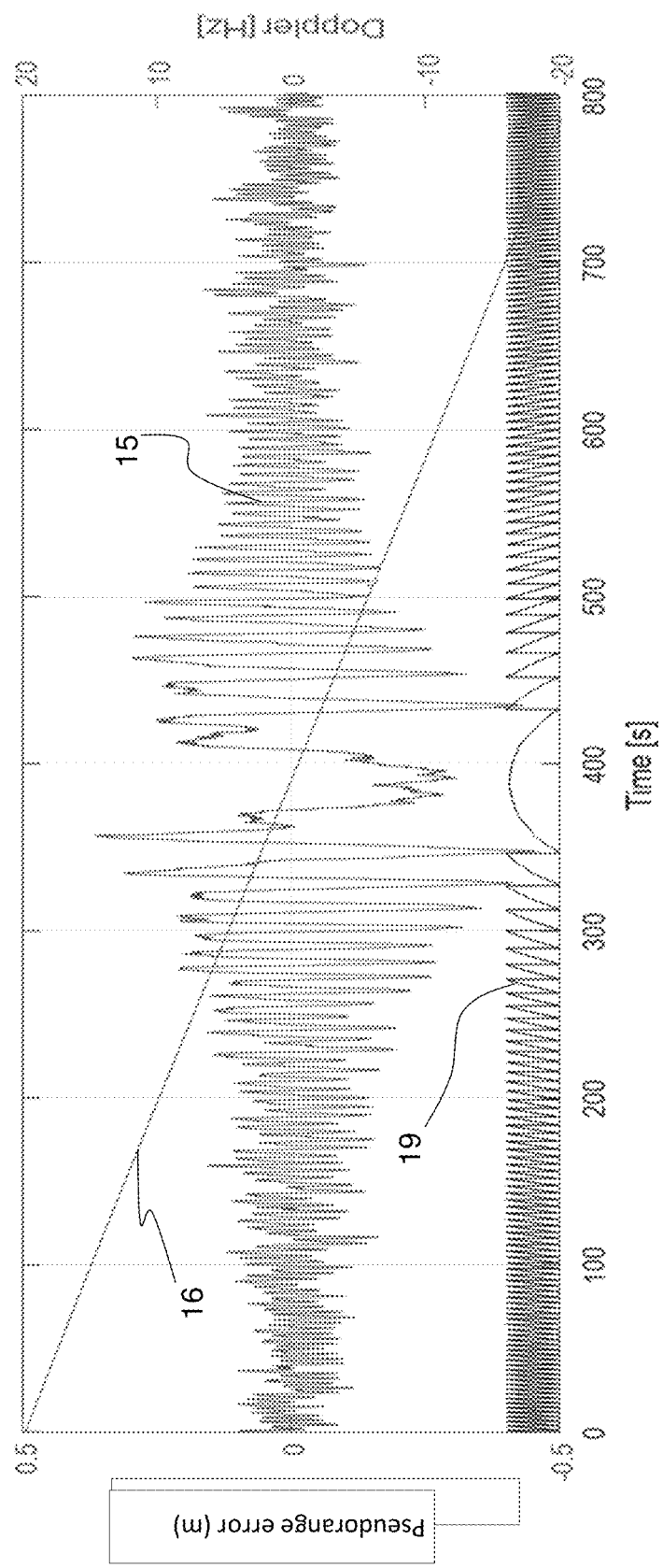
FIG. 8 illustrates the link between the pseudorange error and the pseudorange modulo $cT_s$.

The above-described effects are clearly visible in FIG. 8, which is the same as FIG. 3a, except that the pseudorange modulo $cT_s$ has been added (trace 19—units have been adapted for easier readability and are non physical). As will be explained hereafter, the error is maximum at zero Doppler and decreases as Doppler increases.

The correction of the pseudorange itself at zero Doppler frequency based on a correction term that is equivalent to the above-described term $c\Delta\tau_b$ has effectively been proposed by XiaoJun Jin et al in the above-cited document by these authors. However, the document does not address the non-zero Doppler case, which is in fact the reality in any GNSS, where the pseudorange determined by a receiver with respect to a satellite is changing with time due to the relative movement of the satellite with respect to the receiver. Consequently, $D_b$ and $\Delta\tau_b$ also change with time following the pattern in FIG. 6 and FIG. 7. An oscillating error pattern will be seen in the measured pseudorange, with one period of the pattern corresponding to a change of pseudorange by $cT_s$. If the change of pseudorange is slow, the oscillations will be slow as well. When the rate of the change of the pseudorange increases, the oscillations become faster. This is because the time needed for the pseudorange to change by $cT_s$, for example 15 m when Ts equals 50 ns, becomes shorter and shorter. Eventually the oscillations will be filtered out by the DLL filter, and when the rate of change of the pseudorange is larger than a few meters per seconds, the effect becomes negligible. The rate of change of the pseudorange is directly related to the Doppler, where the Doppler, in Hertz, is the rate of change of the pseudorange divided by the carrier wavelength. In other words, thanks to the DLL filter, the amplitude of the oscillations will decrease as the Doppler increases in absolute value. However, if the correction $c\Delta\tau_b$ as described above is applied at non-zero Doppler, this correction would oscillate faster and faster as the Doppler frequency increases, without damping, which would lead to incorrect results. This problem is solved by the two embodiments of the present disclosure, each embodiment pertaining to a method and to a related receiver for bringing the method into practice. According to the first embodiment, the above-described correction Db is calculated based on the measured pseudorange in the manner described above, e.g., calculated or determined from look-up tables, and the calculated correction is applied to the discriminator value D before the DLL filter. By applying the correction at the level of the discriminator and before the DLL filter, the problems at non-zero Doppler frequency are not encountered, because the correction is already applied before the DLL filter removes any unwanted effects at higher Doppler frequencies. In other words, by applying the correction at the discriminator level, it is by design subject to the low-pass effect of the DLL filter, and fast oscillations are damped.

Figure 9:
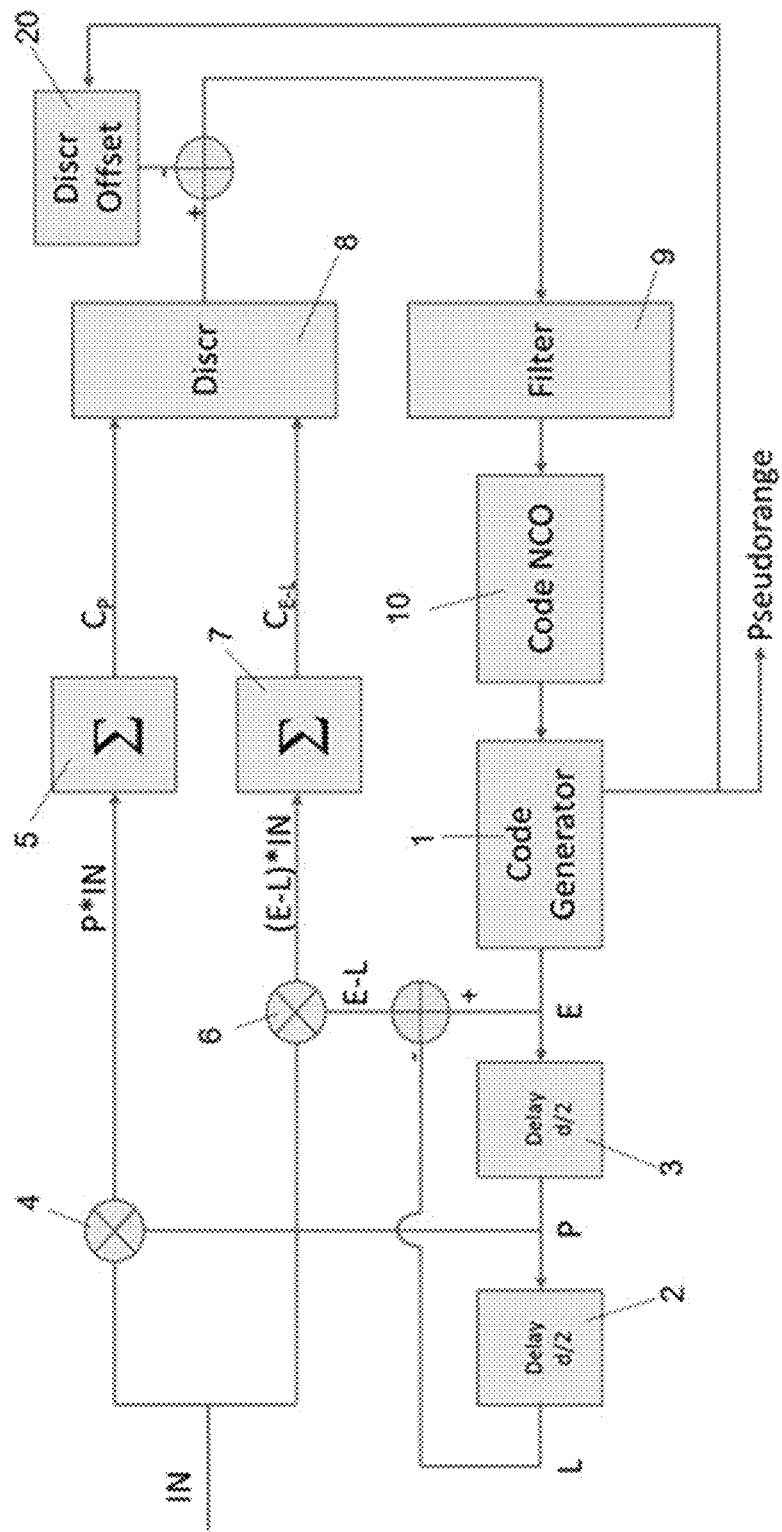
FIG. 9 illustrates a first embodiment where a correction is applied at the DLL discriminator level.

Therefore, according to the first embodiment, the method and receiver are based on the correction of the discriminator output by subtracting the applicable $D_b$ value. A DLL of a receiver according to this embodiment is illustrated in FIG. 9. The numerical references refer to the same components shown with these references in FIG. 2, with the only distinction being that all components are configured to act on sampled signals and not continuous signals. The new block "Discr Offset" 20 is basically a calculator that returns the value of $D_b$ for a particular PRN code and for a particular measured pseudorange cτr. Db is subtracted from the discriminator value D, and the corrected D-value is used as input for the low-pass filter 9 (which is the DLL filter referred to above) and the code NCO 10. The output of the "Discr Offset" block 20 can for example be obtained by performing the calculations explained above in relation to FIG. 6 in real-time within the receiver if sufficient processing power is available, or by precomputing the values of the curve in FIG. 6 and storing them in look-up tables. If look-up tables are used, the receiver must hold a different table for each PRN code, covering at least pseudoranges from 0 to $cT_s$ as $D_b$ only depends on the pseudorange modulo $cT_s$. For example, the table could contain a hundred $D_b$ values corresponding to $$\{\text{Pseudorange}\}_{cT_s} = \frac{k}{100} \cdot cT_s$$

with k=0 . . . 99, and the "Discr Offset" block could return the value of $D_b$ obtained by interpolating these tabulated values at the actual value of $\{\text{Pseudorange}\}_{cT_s}$. Note that the "Discr Offset" block 20 takes the measured pseudorange as input, whereas the calculated curve in FIG. 6 shows Db as a function of the true pseudorange (in fact as a function of τs, i.e., the true pseudorange divided by the speed of light). However, because the discriminator value is corrected by Db, the measured pseudorange is expected to be equal to the true pseudorange. Therefore the curve of FIG. 6 can be used for determining Db in the Discr Offset block 20. The calculation or look-up table may however also be based on Db as a function of the measured pseudorange cτr, at the expense of a slightly degraded accuracy of the correction.

In a variation of the first embodiment, the correction term Db is set to zero above a given Doppler frequency. In this case, the "Discr Offset" block 20 is configured to return zero if the Doppler frequency is larger than a predefined threshold. This is advantageous for avoiding noise insertion.

Figure 10:
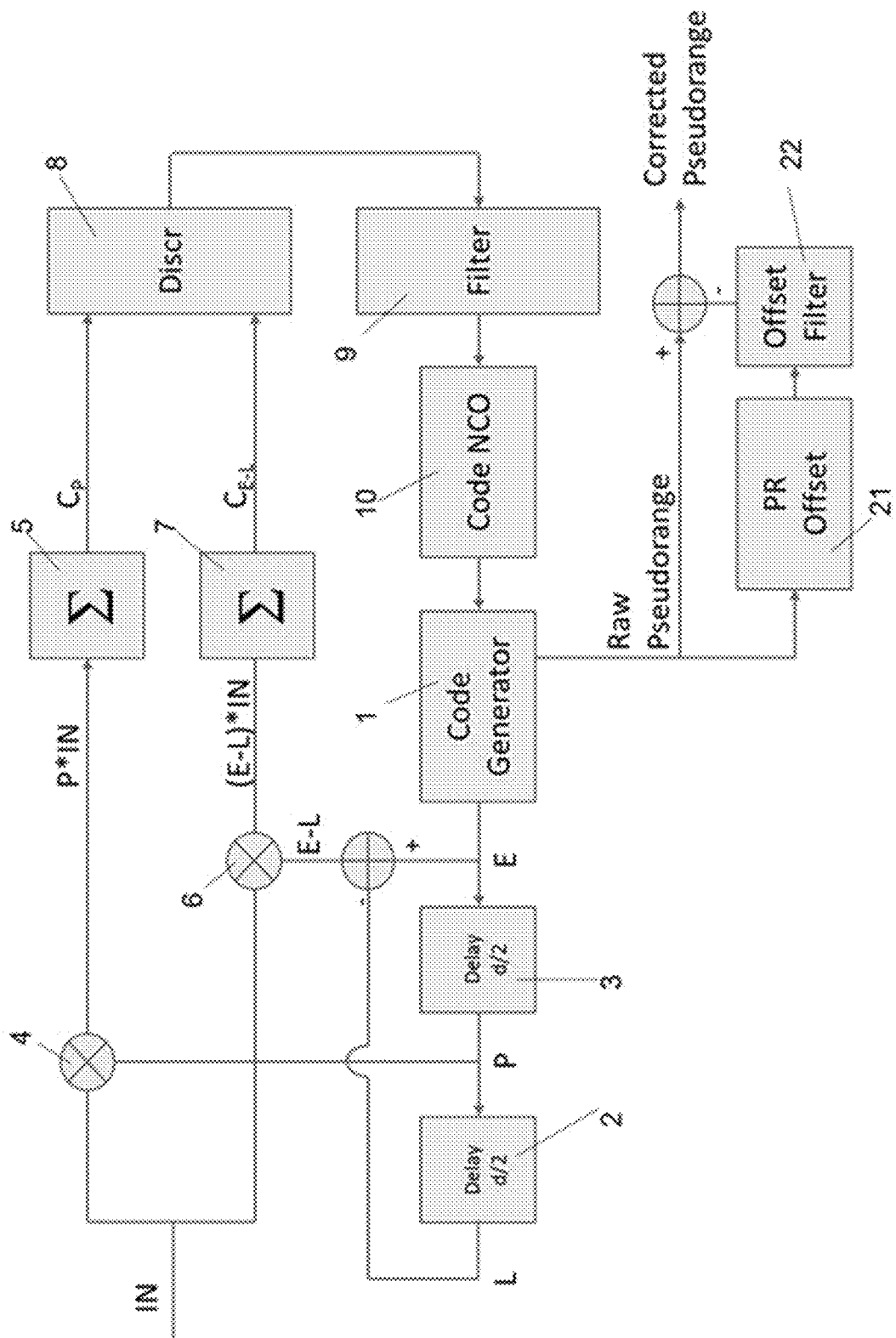
FIG. 10 illustrates a second embodiment where a correction is applied at the pseudorange level.

Instead of correcting the discriminator value, the second embodiment of the present disclosure includes correcting the measured pseudorange by subtracting the applicable $\Delta\tau_b$ value multiplied by the speed of light and filtered by a low-pass filter having substantially the same characteristics as the DLL filter. This low-pass filter is an essential part of the second embodiment. Because of this filter, the amplitude of the correction decreases as the Doppler increases. As stated above, if the filter would not be applied, the correction would oscillate faster and faster as the Doppler frequency increases, without damping. The second embodiment is illustrated in FIG. 10. Again the same components as in FIG. 2 are indicated by the same numerical references. The new block "PR Offset" 21 is basically a calculator that returns the value of $c\Delta\tau_b$ for a particular PRN code and for a particular measured pseudorange. According to the embodiment shown in FIG. 10, the output of the PR offset block is filtered by a low-pass filter 22. This filter has substantially the same characteristics as the DLL filter 9, so that the spectral characteristics of the correction is adjusted to that of the measured pseudorange. The offset value is subtracted from the measured pseudorange, yielding the corrected pseudorange value. The output of the "PR Offset" block can for example be obtained by performing the calculations explained above in relation to FIG. 7 in real-time within the receiver if sufficient processing power is available, or by precomputing the values of the curve in FIG. 7 and storing them in look-up tables. If look-up tables are used, the receiver must hold a different table for each PRN code, covering at least pseudoranges from 0 to $cT_s$ as $c\Delta\tau_b$ only depends on the pseudorange modulo $cT_s$. For example, a table could contain one hundred $c\Delta\tau_b$ values corresponding to $$\{\text{Pseudorange}\}_{cT_s} = \frac{k}{100} \cdot cT_s$$

with k=0 . . . 99, and the "PR Offset" block 21 could return the value of $c\Delta\tau_b$ obtained by interpolating these tabulated values at the actual value of $\{\text{Pseudorange}\}_{cT_s}$.

In a preferred embodiment, the look-up table contains the pseudorange correction as a function of the measured pseudorange modulo cτr (as illustrated in FIG. 7 where the x-axis is the measured delay $\tau_r$). Alternatively, it is possible to store the pseudorange correction as a function of the true pseudorange cτs. In that case, the correction will be less accurate as the true pseudorange slightly differs from the measured pseudorange. This can be improved by iteration (first estimate $c\Delta\tau_b$ at $\{\text{Pseudorange}\}_{cT_s}$, then correct the pseudorange by subtracting $c\Delta\tau_b$, then make another (better) estimate of $c\Delta\tau_b$ using the corrected pseudorange, etc.

In a variation of the second embodiment, the "PR Offset" block is configured to return zero if the Doppler is larger than a predefined threshold. This is advantageous for avoiding noise insertion.

In the above description, Db and Δτb are determined either in real time or by interpolation based on calculated values previously stored in look-up tables. The values in the look-up tables could however also be determined from a calibration of the error for a given receiver using simulated or real-life signals. This can for example be done by connecting the receiver to a GNSS signal simulator generating error-free signals with a controlled Doppler pattern. In that case, any variation in the pseudorange such as the one shown in FIG. 3 is readily measurable. More specifically, the values in the look-up table for the pseudorange error cΔτb can be directly measured for a given pseudorange and PRN code, by comparing the measured pseudorange with the simulated error-free pseudorange. In this case cΔτb is therefore not calculated as the value of cΔτ for which D=0, but measured experimentally. The calculated and measured values will be similar but not necessarily mathematically equal as the measurement may depend on the accuracy of the simulated signals. The present disclosure is thus not limited to a particular way in which the correction terms in the look-up tables are obtained. What is important is that a predefined relation between the measured pseudorange and one of these correction terms is implemented in the receiver, i.e., that the receiver is capable of determining the correction term for any measured pseudorange. The observed pseudorange error obtained from the calibration is again a periodic function of the pseudorange: the same error repeats every cTs. The periodic function will be similar to the mathematically obtained curves shown in FIGS. 6 and 7. One can therefore construct a calibration table containing the error as a function of the pseudorange modulo cTs, for all possible PRN codes. The same can be done with real-life signals, where the pseudorange error can be monitored using combinations of pseudorange and carrier phase measurements in a way known in the art. The disadvantage of real-life calibration is that the observability of the pseudorange error is lower due to the presence of other sources of error (such as multipath effects), and because the useful time interval, during which the Doppler is close to zero, is short in real-life conditions (see FIG. 3b). Simulated signals allow to overcome these difficulties.

Throughout the above description, the method of the present disclosure is applied to the 'measured pseudorange'. In the present context, this term 'measured pseudorange' applies to the actual pseudorange, i.e., an estimation of the distance between the receiver and the satellite, as well as to this distance plus any integer number of milliseconds multiplied by the speed of light. This millisecond ambiguity of the pseudorange may, for example, occur when the pseudoranges are encoded in some differential correction messages. The method is applicable without change to pseudoranges with a millisecond ambiguity.

Figure 11:
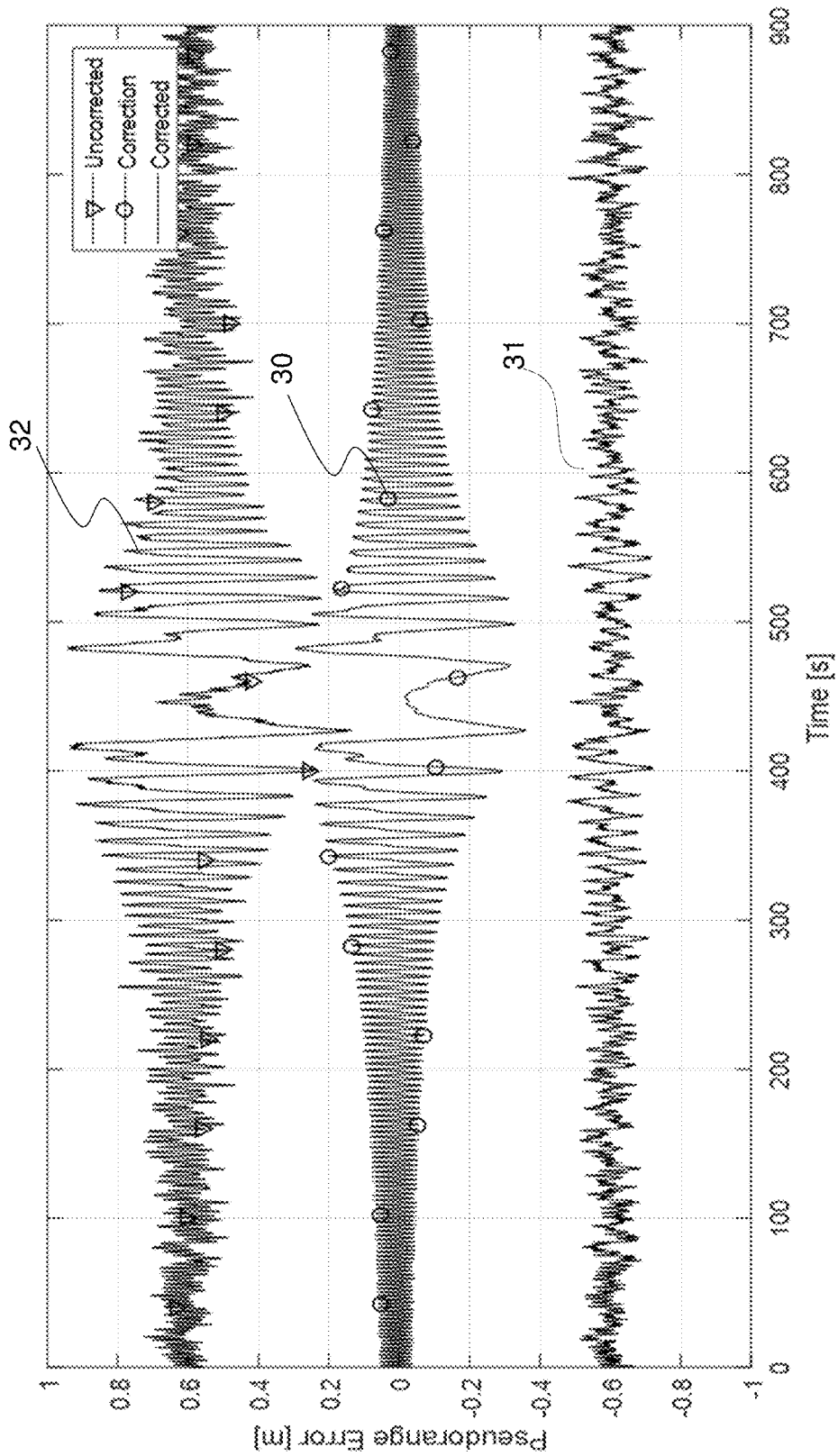
FIG. 11 illustrates the validity of the method disclosed herein, by showing the an improvement between raw and corrected pseudoranges.

FIG. 11 shows the result of applying the method of the present disclosure to a pseudorange taken from real signals using a geodetic-grade GNSS receiver. Curve 32 shows the uncorrected pseudorange error. Curve 30 corresponds to the output of the PR offset filter in FIG. 10. Curve 31 represents the pseudorange error after correction c$\Delta\tau$b. Curves 30 and 31 have been shifted upwards and downwards respectively along the y-axis to show the curves separately so as to improve their visibility. It can be seen that the pseudorange error is largely reduced using this technique.

The invention claimed is:

1. A method for correcting a measured pseudorange obtained by a receiver for satellite navigation, the receiver comprising a delay-lock-loop (DLL) including a DLL filter and a discriminator for calculating a discriminator value D, wherein the measured pseudorange is an estimation of a true pseudorange, the method comprising:
   downconverting an RF signal emitted by a satellite to a baseband or to an IF frequency, to obtain a downconverted signal containing at least a pseudo-random noise (PRN) code representative of the satellite;
   sampling the downconverted signal to obtain a discrete-time signal at a given sampling frequency $F_s$;
   synchronizing a local replica of the PRN code with the discrete-time signal on the basis of the discriminator value filtered by the DLL filter to obtain a synchronized local replica, and determining the measured pseudorange c$\tau_r$ from the synchronized local replica, wherein $\tau_r$ is an estimate of a time delay $\tau_s$ of the RF signal from the satellite based on the synchronized local replica and c is the speed of light, and $\Delta\tau=\tau_r-\tau_s$ such that the pseudorange error is equal to c$\Delta\tau$,
   determining by the receiver a correction term C$\Delta\tau_b$ for the pseudorange error, wherein the correction term is a periodic function of the measured or the true pseudorange with a period equal to c$T_s$, with $T_s$ equal to 1/$F_s$, wherein $\Delta\tau_b$ is a value of $\Delta t$ for which the discriminator value D is zero, and wherein the method comprises the steps of:
      determining the correction term C$\Delta\tau_b$ at the measured pseudorange;
      filtering the correction term C$\Delta\tau_b$ by a low-pass filter; and
      subtracting the filtered C$\Delta\tau_b$ value from C$\tau_r$ to obtain a corrected pseudorange value.

2. The method according to claim 1, wherein the receiver is configured to calculate in real time the value of the correction term C$\Delta\tau_b$=C$\Delta\tau$(D=0), using the measured pseudorange as input for the calculation.

3. The method of claim 2, wherein $\Delta\tau_b$ is set to zero when the Doppler frequency exceeds a selected threshold.

4. The method according to claim 1, wherein the receiver further comprises a look-up table comprising a first plurality of values of the correction term C$\Delta\tau_b$ for a second plurality of values of either the true pseudorange or the measured pseudorange at least between 0 and c$T_s$, and wherein the correction term C$\Delta\tau_b$ is determined by interpolation between values of the look-up table.

5. The method according to claim 4, wherein the values of the look-up table are determined by: (a) calculation of C$\Delta\tau_b$ as the value of $\Delta\tau$ for which the discriminator value D is zero for the second plurality of values of true or measured pseudoranges at least between 0 and c$T_s$ or (b) by calibration of the receiver on a basis of simulated signals or measured signals.

6. The method of claim 4, wherein $\Delta\tau_b$ is set to zero when the Doppler frequency exceeds a selected threshold.

7. The method of claim 5, wherein $\Delta\tau_b$ is set to zero when the Doppler frequency exceeds a selected threshold.

8. The method of claim 1, wherein $\Delta\tau_b$ is set to zero when the Doppler frequency exceeds a selected threshold.

9. A method for correcting a measured pseudorange obtained by a receiver for satellite navigation, the receiver comprising a delay-lock-loop including a DLL filter and a discriminator for calculating a discriminator value D, wherein the measured pseudorange is an estimation of a true pseudorange, the method comprising:
   downconverting an RF signal emitted by a satellite to a baseband or to an IF frequency, to thereby obtain a downconverted signal containing at least a pseudo-random noise (PRN) code representative of the satellite;
   sampling the downconverted signal to thereby obtain a sampled signal comprising the PRN code sampled at a given sampling frequency $F_s$;
   synchronizing a local replica of the PRN code with the sampled signal on the basis of the discriminator value filtered by the DLL filter to obtain a synchronized local replica, and determining the measured pseudorange c$\tau_r$ from the synchronized local replica, wherein $\tau_r$ is an estimate of a time delay $\tau_s$ of the RF signal from the satellite based on the synchronized local replica and c is the speed of light, and $\Delta\tau=\tau_r-\tau_s$ such that the pseudorange error is equal to c$\Delta\tau$;
   determining by the receiver a discriminator correction term Db for the discriminator value D, wherein the correction term is a periodic function of the measured or the true pseudorange with a period equal to c$T_s$, with $T_s$ equal to 1/$F_s$, wherein $D_b$ is the value of D when $\Delta\tau$ is zero and wherein the method comprises the steps of:
      determining $D_b$ at the measured pseudorange, and
      subtracting $D_b$ from the discriminator value D calculated by the discriminator prior to the DLL filter, to obtain a corrected discriminator value, wherein the synchronizing step is done on the basis of the corrected discriminator value, filtered by the DLL filter.

10. The method according to claim 9, wherein the receiver is configured to calculate the value of $D_b$=D($\Delta\tau$=0) in real time, using the measured pseudorange as input for the calculation.

11. The method of claim 10, wherein $D_b$ is set to zero when the Doppler frequency exceeds a selected threshold.

12. The method according to claim 9, wherein the receiver further comprises a look-up table comprising a first plurality of values of Db for a second plurality of values of either the true pseudorange or measured pseudorange at least between 0 and c$T_s$, and wherein $D_b$ is determined by interpolation between values from the look-up table.

13. The method according to claim 12, wherein the values from the look-up table are determined by: (a) calculation of $D_b$ as the value of D when $\Delta\tau$ is zero for the second plurality of values of true or measured pseudoranges at least between 0 and $cT_s$ or (b) calibration of the receiver on the basis of simulated signals or measured signals.

14. The method of claim 12, wherein $D_b$ is set to zero when the Doppler frequency exceeds a selected threshold.

15. The method of claim 13, wherein $D_b$ is set to zero when the Doppler frequency exceeds a selected threshold.

16. The method of claim 9, wherein $D_b$ is set to zero when the Doppler frequency exceeds a selected threshold.

17. A receiver for satellite navigation comprising:
   an antenna for capturing an RF signal from a global navigation satellite,
   a downconvertor for obtaining a downconverted signal containing at least a pseudo-random noise code (PRN) representative of the satellite,
   a sampler for sampling the downconverted signal so as to obtain a discrete sequence at a sampling frequency $F_s$,
   a delay lock loop circuit comprising:
      a code generator and delay elements for generating local punctual, early and late replicas of the PRN code,
      correlators for calculating correlation values between the downconverted signal and the local replicas or combinations of said lithe local replicas,
      a discriminator circuit for calculating a discriminator value D from the correlation values,
      a first filter circuit for low-pass filtering the discriminator output,
      a numerically controlled oscillator for controlling the chipping rate of the local replicas,
      a pseudorange calculator for calculating a measured pseudorange from a phase of the punctual replica,
   wherein the receiver further comprises:
      a pseudorange correction calculator for calculating a correction term $C\Delta\tau_b$, wherein $c\Delta\tau_b$ is a correction term for a pseudorange error, wherein the correction term is a periodic function of the measured pseudoranqe with a period equal to $cT_s$, with c equal to the speed of light, and $T_s$ equal to $1/F_s$, wherein $\Delta\tau=\tau_r-\tau_s$, $\tau r$ is an estimate of a time delay $\tau_s$ of the RF signal from the satellite, and $\Delta\tau_b$ is a value of $\Delta\tau$ for which the discriminator value D is zero,
      a second filter circuit for applying a low-pass filtering to the output correction term of the pseudorange correction calculator, the second filter circuit having the same characteristics as the first filter circuit,
      a subtraction circuit for determining a corrected pseudorange.

18. A receiver for satellite navigation comprising:
   an antenna for capturing an RF signal from a global navigation satellite,
   a downconvertor for obtaining a downconverted signal containing at least a pseudo-random noise code (PRN) representative for the satellite,
   a sampler for sampling the downconverted signal so as to obtain a discrete sequence at a sampling frequency $F_s$,
   a delay lock loop circuit comprising:
      a code generator and delay elements for generating local punctual, early and late replicas of the PRN code,
      correlators for calculating correlation values between the downconverted signal and the local replicas or combinations of the local replicas,
      a discriminator circuit for calculating a discriminator value D from the correlation values,
      a filter circuit for low-pass filtering the discriminator output,
      a numerically controlled oscillator for controlling the chipping rate of the local replicas,
      a pseudorange calculator for calculating a measured pseudorange from the phase of the punctual replica,
   wherein the DLL further comprises:
      a calculator for calculating Db, wherein Db is a correction term for the discriminator value D, wherein the correction term is a periodic function of the measured pseudorange with a period equal to $cT_s$, with c equal to the speed of light, $T_s$ equal to $1/F_s$, and $D_b$ is the value of D when a difference between an estimated and an actual time delay of the RF signal from the satellite is zero, and
      a subtraction circuit for determining a corrected discriminator value.

* * * * *